US008461786B2

United States Patent
Morawek

(10) Patent No.: US 8,461,786 B2
(45) Date of Patent: Jun. 11, 2013

(54) METHOD AND DEVICE FOR DETERMINING THE POSITION OF A MOBILE CLOSING PART OF A VEHICLE

(75) Inventor: Roman Morawek, Vienna (AT)

(73) Assignee: Continental Automotive GmbH, Hannover (DE)

( * ) Notice: Subject to any disclaimer, the term of this patent is extended or adjusted under 35 U.S.C. 154(b) by 356 days.

(21) Appl. No.: 12/742,876

(22) PCT Filed: Oct. 24, 2008

(86) PCT No.: PCT/EP2008/064430
§ 371 (c)(1),
(2), (4) Date: May 13, 2010

(87) PCT Pub. No.: WO2009/065699
PCT Pub. Date: May 28, 2009

(65) Prior Publication Data
US 2010/0259249 A1    Oct. 14, 2010

(30) Foreign Application Priority Data
Nov. 22, 2007    (DE) .......................... 10 2007 056 229

(51) Int. Cl.
*H02P 1/00*    (2006.01)
*G05D 3/12*    (2006.01)
(52) U.S. Cl.
CPC .................................... *G05D 3/127* (2013.01)
USPC .......... 318/265; 318/264; 318/255; 318/256; 318/244; 318/245

(58) Field of Classification Search
CPC ...................................................... G05D 3/127
USPC ................. 318/265, 264, 255–256, 244–245
See application file for complete search history.

(56) References Cited

U.S. PATENT DOCUMENTS

| 3,708,746 A | 1/1973 | Willett ............................. 324/77 |
| 4,924,166 A | 5/1990 | Roussel .......................... 318/608 |
| 5,524,168 A | 6/1996 | Macks et al. ................... 388/814 |
| 6,144,179 A | 11/2000 | Kessler et al. ................. 318/565 |
| 6,172,473 B1 | 1/2001 | Oka et al. ....................... 318/244 |

(Continued)

FOREIGN PATENT DOCUMENTS

| DE | 68902664 | 4/1993 |
| DE | 19729238 | 8/1998 |

(Continued)

OTHER PUBLICATIONS

International Search Report and Written Opinion for Application No. PCT/EP2008/064430 (19 pages), May 7, 2010.

(Continued)

*Primary Examiner* — Walter Benson
*Assistant Examiner* — David Luo
(74) *Attorney, Agent, or Firm* — King & Spalding L.L.P.

(57) ABSTRACT

In a method and a device for determining the position of a closing part of a vehicle, that can be moved by a direct-current motor, a motor current signal is derived from the direct-current motor and converted into a digital signal by an analog-digital converter. The signal is filtered and forwarded to a position counter for counting the current ripple. The scanning frequency of the analog-digital converter is modified according to the rotational speed of the direct-current motor.

17 Claims, 1 Drawing Sheet

U.S. PATENT DOCUMENTS

| | | | |
|---|---|---|---|
| 6,404,158 B1 * | 6/2002 | Boisvert et al. | 318/469 |
| 6,548,979 B2 * | 4/2003 | Boisvert et al. | 318/469 |
| 7,180,255 B2 | 2/2007 | Fulks et al. | 318/138 |
| 7,196,486 B2 * | 3/2007 | Nakamura et al. | 318/469 |
| 7,548,037 B2 * | 6/2009 | Boisvert et al. | 318/466 |

FOREIGN PATENT DOCUMENTS

| | | |
|---|---|---|
| DE | 19834108 | 2/2000 |
| DE | 19946699 | 5/2000 |
| EP | 0689054 | 12/1995 |
| EP | 0730156 | 9/1996 |
| EP | 0890841 | 1/1999 |

OTHER PUBLICATIONS

German Office Action for Application No. 10 2007 056 229.4 (4 pages), Jun. 30, 2008.

* cited by examiner

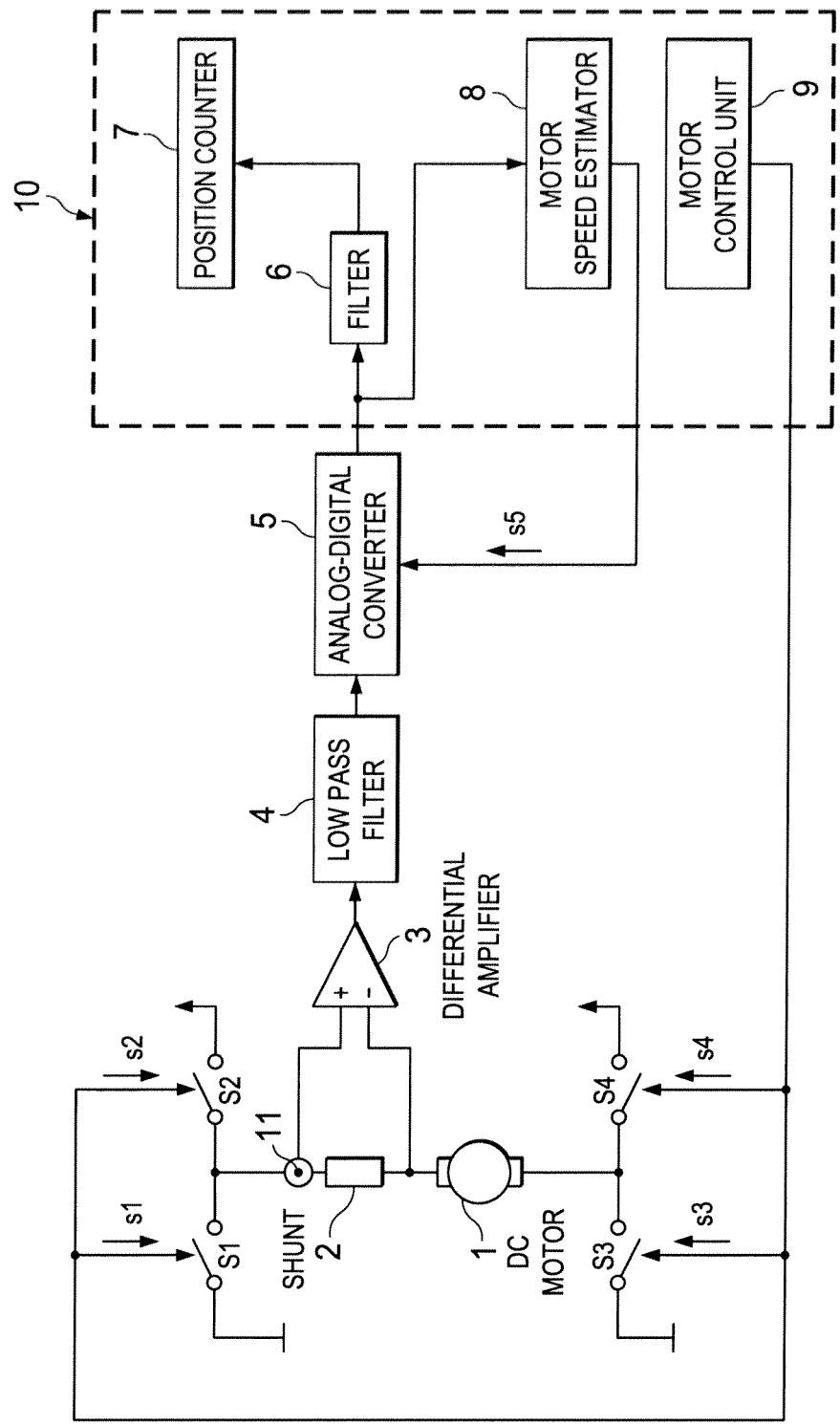

METHOD AND DEVICE FOR DETERMINING THE POSITION OF A MOBILE CLOSING PART OF A VEHICLE

CROSS-REFERENCE TO RELATED APPLICATIONS

This application is a U.S. National Stage Application of International Application No. PCT/EP2008/064430 filed Oct. 24, 2008, which designates the United States of America, and claims priority to German Application No. 10 2007 056 229.4 filed Nov. 22, 2007, the contents of which are hereby incorporated by reference in their entirety.

TECHNICAL FIELD

The invention relates to a method and a device for determining the position of a mobile closing part of a vehicle.

BACKGROUND

Mobile closing parts of vehicles, for example sliding roofs and window lifters, are equipped with a device for determining position. This device for determining position is necessary so that the windows and/or sliding roofs stop at designated positions. It is also necessary for ensuring the statutory requirements relative to anti-trap protection.

In cost-effective systems, the position is determined by counting the commutation current ripple. The commutation current ripple is counted by the current ripples, hereinafter referred to as the ripple, being removed by bandpass filtering. To achieve this, the current is usually rapidly sampled by an analog/digital converter, for example every 200 μsec, and then subjected to digital filtering. As the ripple frequency is determined by the motor rotational speed and this may vary widely, the center frequency of the bandpass filter used has to be correspondingly adjusted.

In this connection, there are two main approaches in the prior art. Either an adaptive bandpass filter is used, the coefficients thereof being altered. Alternatively, a plurality of fixed filters with variable center frequencies is used in combination with a multiplexer for selecting the filter which is best suited for the current motor rotational speed.

Both aforementioned solutions have the drawback that they require a high level of computing power. This, in turn, requires the use of a microcomputer with a high level of computing power and leads to high system costs.

It is known from the periodical "Elektronik", No. 25 of 14.12. 1984, pages 71-72, to determine the rotational speed of a direct-current motor incrementally from the commutation ripple of the armature current and to use it for controlling the rotational speed. In this case an analog circuit determines an approximate measurement of the rotational speed from the motor current. Thus a voltage/frequency converter is activated so that its initial frequency sets the frequency limit of a switched capacitor filter, so that the fundamental component of the commutation ripple is present at the output thereof.

A method and a device for measuring the rotational speed of a mechanically commutated direct-current motor is disclosed in EP 0 689 054 A1. In this case, the ripple of the current arising during commutation is detected using an electronic circuit and the frequency of the ripple evaluated as a measurement of the rotational speed. For detection and signal conditioning, the measured object motor is coupled to the detection and measurement device via a direct-current path, and the generation of the current ripple for the detection and measurement device takes place via a direct-current path. The signal of the current ripple thus generated is phase-shifted. The phase-shifted and the non-phase-shifted signal of the current ripple are added to one another or subtracted from one another in analog form. The resulting current ripple signal is evaluated with regard to its frequency, this evaluation being carried out relative to its zero crossings.

A method and a device for measuring the speed of a direct-current motor is disclosed in EP 0 730 156 A1. In this case, the signal is evaluated at the negative terminal of the motor. This signal is high-pass filtered in order to separate the ac components of the signal. The frequency of this signal is in most cases proportional to the speed of the motor. This signal is fed to a comparator which converts it into a square wave signal. Said signal is fed to a microprocessor which determines the frequency thereof. If this is below a first predetermined threshold value or above a second predetermined threshold value, the microprocessor then switches the motor off and emits an error signal.

A method for determining the rotational speed in mechanically commutated direct-current motors from the time characteristic of the ripple of the motor current occurring during commutation is disclosed in EP 0 890 841 B1. In this method, the time characteristic of the ripple of the motor current is detected, the commutation time is determined and the rotational speed and/or the angle of rotation derived therefrom in an evaluation unit. At the same time as the detection of the ripple of the motor current from a motor state model, which is based on the electromechanical motor equations, a permissible reference time range is determined from the motor current and the motor voltage. The commutation times are taken into consideration by the evaluation unit only if said unit is in the permissible reference time range. If, within the permissible reference time range, no commutation ripple may be assigned, then the evaluation unit extrapolates a probable commutation time for this reference time range from the motor state model.

SUMMARY

According to various embodiments, a method and a device for determining the position of a closing part of a vehicle can be specified which may be moved by a direct-current motor, in which the evaluation of the commutation current ripple is simplified.

According to an embodiment, a method for determining the position of a closing part of a vehicle which may be moved by a direct-current motor may comprise: —providing a motor current signal, —converting the motor current signal into a digital signal by means of an analog-digital converter, —filtering the output signal of the analog-digital converter and—forwarding the filtered signal to a position counter, wherein the sampling frequency of the analog-digital converter is modified according to the rotational speed of the direct-current motor.

According to a further embodiment, the digital output signal of the analog-digital converter can be forwarded to the position counter via a separate bandpass filter with a fixedly predetermined passband. According to a further embodiment, the rotational speed of the direct-current motor can be determined by means of a rotational speed estimator. According to a further embodiment, the rotational speed of the direct-current motor can be estimated by using a motor model. According to a further embodiment, the motor current signal can be removed by a measuring shunt and is fed to the analog-digital converter via an operational amplifier and a low-pass filter arranged in series therewith.

According to another embodiment, a device for determining the position of a closing part of a vehicle which may be moved by a direct-current motor, may comprise—a direct-current motor, —means for providing a motor current signal, —an analog-digital converter for sampling the motor current signal at a sampling frequency, —a filter connected to the output of the analog-digital converter and—a position counter connected to the output of the filter, wherein it has furthermore—a motor rotational speed estimator which is connected to a control input of the analog-digital converter and provides to the analog-digital converter a control signal modifying the sampling frequency of the analog-digital converter according to the estimated motor rotational speed.

According to a further embodiment of the device, the filter may have a bandpass characteristic with a fixedly predetermined passband. According to a further embodiment of the device, the motor rotational speed estimator may contain a motor model. According to a further embodiment of the device, the means for providing the motor current signal have a measuring shunt and a current sensor. According to a further embodiment of the device, the current sensor may be connected via a difference amplifier and a low-pass filter to the analog-digital converter. According to a further embodiment of the device, the filter, the position counter, the motor rotational speed estimator and a motor control unit may be components of a microcomputer.

BRIEF DESCRIPTION OF THE DRAWINGS

Further advantages of the invention are revealed from the following explanation thereof, with reference to an exemplary embodiment shown in FIG. 1.

FIG. 1 shows a block diagram of a device according to an embodiment.

DETAILED DESCRIPTION

The advantages of the various embodiments are, in particular, that irrespective of the current rotational speed of the direct-current motor, approximately the same number of sampled values of the motor current is always provided. These sampled values of the motor current are fed to a fixed filter adapted thereto and forwarded via this filter to the downstream components. The use of an adaptive bandpass filter is not necessary. Also, it is not necessary to use a plurality of filters with variable center frequencies, in conjunction with switching between said filters. As a result, the necessity of using a costly computational algorithm for selecting the filter is also dispensed with.

In the method according to various embodiments, a signal with an approximately constant number of sampled values for each motor current ripple is always available at the output of the analog-digital converter, for example with a quantity of 7 to 12 sampled values. This also has the result that the ripple count which is carried out downstream is simplified.

A further advantage is that the sampling rate does not have to be permanently set for the highest possible motor rotational speed but may be selected to be only as high as necessary.

FIG. 1 shows a block diagram of a device for determining the position of a mobile closing part of a vehicle. It is assumed hereinafter that this mobile closing part is a window pane of the vehicle.

Said window pane is moved by a direct-current motor 1, which is switched on and off by a motor control unit 9. Depending on the rotational direction of the motor, the window pane is opened or closed.

For opening the window pane, the motor control unit 9 feeds a control signal s4 to the switch S4 and a control signal s1 to the switch S1. The control signal s4 brings the switch S4 into the conductive state. The control signal s1 brings the switch S1 into the conductive state. As a result, a motor current flows from a voltage source, not illustrated, through the switch S4, the motor 1, a measuring shunt 2 and the switch S1 to ground.

For closing the window pane, the motor control unit 9 feeds a control signal s2 to the switch S2 and a control signal s3 to the switch S3. The control signal s2 brings the switch S2 into the conductive state. The control signal s3 brings the switch S3 into the conductive state. As a result, a motor current flows from a voltage source, not illustrated, through the switch S2, the measuring shunt 2, the motor 1 and the switch S3 to ground.

The upper terminal of the measuring shunt 2 in FIG. 1 is connected to the positive input of a differential amplifier 3. The lower terminal of the measuring shunt 2 in FIG. 1 is connected to the negative input of the differential amplifier 3.

The output signal of the differential amplifier 3 is low-pass filtered in a low-pass filter 4 and then converted in an analog-digital converter 5 into a digital signal. The sampling frequency of the analog-digital converter 5 is predetermined by a control signal s5 and/or set by this control signal.

The output signal of the analog-digital converter 5 is fed to a filter 6. The output signal thereof is fed to a position counter 7 and to a motor speed estimator and/or motor rotational speed estimator 8. The position counter 7 is provided for counting the ripple of the motor current. The rotational speed estimator 8 which has a motor model, is provided for estimating the current motor speed and/or motor rotational speed and for emitting the control signal s5. The control signal s5 is dependent on the current motor speed and/or motor rotational speed and adjusts the sampling frequency of the analog-digital converter 5 according to the estimated motor speed and/or motor rotational speed.

A method for determining the position of a closing part of a vehicle which may be moved by a direct-current motor may be carried out by means of the above-disclosed device, in which the ripple of the motor current is counted. This method functions as follows:

Initially the direct-current motor 1 is activated and/or set in rotation by closing the switches S1 and S4 or S2 and S3.

In the next step, a motor current signal is provided. This is produced in the exemplary embodiment shown by means of a current sensor 11 which picks up the motor current signal from the measuring shunt 2 connected to the direct-current motor.

The motor current signal derived from the measuring shunt 2 is amplified in the differential amplifier 3. The amplified signal is subjected to low-pass filtering in the low-pass filter 4 and then fed to the analog-digital converter 5. The output signal of the analog-digital converter 5 is forwarded to the filter 6, which is a bandpass filter with a fixedly predetermined passband, and to the motor rotational speed estimator 8.

The motor rotational speed estimator 8 estimates the current rotational speed of the direct-current motor 1 and produces a control signal s5, by means of which the sampling frequency of the analog-digital converter 5 is adjusted to a sampling frequency according to the estimated value of the rotational speed. This is selected so that, irrespective of the rotational speed, approximately the same number of sampled values for each motor current ripple is always forwarded to the filter 6.

The output signal of the filter 6 is fed to the position counter 7, by means of which an accurate ripple count is carried out. This count represents an accurate description of the current position of the mobile closing part and may be used by an evaluation unit arranged downstream, for example, for stopping the closing part at a predetermined position or in conjunction with ensuring the statutory requirements relative to anti-trap protection.

What is claimed is:

1. A method for determining the position of a closing part of a vehicle which may be moved by a direct-current motor comprising:
   providing a motor current signal,
   converting the motor current signal into a digital signal by means of an analog-digital converter,
   filtering the output signal of the analog-digital converter
   forwarding the filtered signal to a position counter for determining the position of the closing part,
   estimating a rotational speed of the direct-current motor based on the digital output signal of the analog-digital converter,
   generating a sampling frequency control signal based on the estimated rotational speed of the direct-current motor, and
   using the sampling frequency control signal to automatically modify the sampling frequency of the analog-digital converter, such that the sampling frequency is automatically reduced in connection with a reduction in the rotational speed of the direct-current motor, thereby reducing computer power associated with sampling the analog-digital converter during reduced rotational speeds of the direct-current motor.

2. The method according to claim 1, wherein the digital output signal of the analog-digital converter is forwarded to the position counter via a separate bandpass filter with a fixedly predetermined passband.

3. The method according to claim 1, wherein the rotational speed of the direct-current motor is determined by means of a rotational speed estimator.

4. The method according to claim 3, wherein the rotational speed of the direct-current motor is estimated by using a motor model.

5. The method according to claim 1, wherein the motor current signal is removed by a measuring shunt and is fed to the analog-digital converter via an operational amplifier and a low-pass filter arranged in series therewith.

6. A device for determining the position of a closing part of a vehicle which may be moved by a direct-current motor, comprising:
   a direct-current motor,
   means for providing a motor current signal,
   an analog-digital converter for sampling the motor current signal at a sampling frequency,
   a filter connected to an output of the analog-digital converter,
   a position counter connected to an output of the filter, and
   a motor rotational speed estimator which is connected to a control input of the analog-digital converter and which is configured to:
     estimate a rotational speed of the direct-current motor based on an output of the analog-digital converter,
     generate a control signal based on the estimated rotational speed of the direct-current motor, and
     provide to the analog-digital converter the control signal to modify the sampling frequency of the analog-digital converter, such that the sampling frequency is automatically reduced in connection with a reduction in the rotational speed of the direct-current motor, thereby reducing computer power associated with sampling the analog-digital converter during reduced rotational speeds of the direct-current motor.

7. The device according to claim 6, wherein the filter has a bandpass characteristic with a fixedly predetermined passband.

8. The device according to claim 6, wherein the motor rotational speed estimator contains a motor model.

9. The device according to claim 6, wherein the means for providing the motor current signal have a measuring shunt and a current sensor.

10. The device according to claim 9, wherein the current sensor is connected via a differential amplifier and a low-pass filter to the analog-digital converter.

11. The device according to claim 6, wherein the filter, the position counter, the motor rotational speed estimator and a motor control unit are components of a microcomputer.

12. A device for determining the position of a closing part of a vehicle which may be moved by a direct-current motor, comprising:
    a direct-current motor,
    a motor current sensor coupled with said direct-current motor,
    an analog-digital converter coupled with the motor current sensor,
    a filter connected to an output of the analog-digital converter,
    a counter connected to an output of the filter, and
    a motor rotational speed estimator which is connected to a control input of the analog-digital converter and which is configured to:
      estimate a rotational speed of the direct-current motor based on an output of the analog-digital converter,
      generate a control signal based on the estimated rotational speed of the direct-current motor, and
      provide to the analog-digital converter the control signal to modify the sampling frequency of the analog-digital converter, such that the sampling frequency is automatically reduced in connection with a reduction in the rotational speed of the direct-current motor, thereby reducing computer power associated with sampling the analog-digital converter during reduced rotational speeds of the direct-current motor.

13. The device according to claim 12, wherein the filter has a bandpass characteristic with a fixedly predetermined passband.

14. The device according to claim 12, wherein the motor rotational speed estimator contains a motor model and estimates the motor rotational speed from output signals of said analog-digital converter.

15. The device according to claim 12, wherein the motor current sensor is a measuring shunt coupled with a differential amplifier.

16. The device according to claim 15, wherein the differential amplifier is coupled with a low-pass filter.

17. The device according to claim 12, wherein the filter, the position counter, the motor rotational speed estimator and a motor control unit are components of a microcomputer.

* * * * *